United States Patent
Jones

(10) Patent No.: US 7,609,817 B1
(45) Date of Patent: Oct. 27, 2009

(54) TERMINATION CIRCUIT FOR NETWORK INTERFACE UNIT

(75) Inventor: David E. Jones, Huntsville, AL (US)

(73) Assignee: ADTRAN, Inc., Huntsville, AL (US)

( * ) Notice: Subject to any disclaimer, the term of this patent is extended or adjusted under 35 U.S.C. 154(b) by 878 days.

(21) Appl. No.: 11/174,924

(22) Filed: Jul. 5, 2005

(51) Int. Cl.
H04M 1/24 (2006.01)
H04M 3/08 (2006.01)
H04M 3/22 (2006.01)
H04M 1/00 (2006.01)

(52) U.S. Cl. ............. 379/22.01; 379/29.01; 379/413.02
(58) Field of Classification Search ............... 379/1.01, 379/15.05, 17, 22.01, 22.03, 22.07, 26.01, 379/27.06, 29.01, 29.06, 29.11, 399.01, 413.02
See application file for complete search history.

(56) References Cited

U.S. PATENT DOCUMENTS

| | | | |
|---|---|---|---|
| 4,258,236 A * | 3/1981 | Conklin et al. ........... 379/22.01 |
| 4,568,802 A * | 2/1986 | Bradley et al. ........... 379/22.08 |
| 5,553,059 A * | 9/1996 | Emerson et al. .............. 370/248 |
| 5,689,546 A | 11/1997 | Sheets et al. |
| 6,091,712 A | 7/2000 | Pope et al. |
| 6,275,510 B1 | 8/2001 | Koenig et al. |
| 6,317,415 B1 | 11/2001 | Darnell et al. |
| 6,453,432 B1 | 9/2002 | Pesetski et al. |
| 7,068,757 B1 * | 6/2006 | Burnett ..................... 379/29.01 |

* cited by examiner

*Primary Examiner*—Quoc D Tran
(74) *Attorney, Agent, or Firm*—Lanier Ford Shaver & Payne, P.C.; Jon E. Holland

(57) ABSTRACT

A network interface unit has an interface coupled to a first transmit line and a first receive line, and the interface is configured to receive a signal from the first receive line. The network interface unit further has circuitry operable in a test mode and a data mode that couples the received signal to the second transmit line via a first path while operating in the data mode. The circuitry further disables coupling of the signal to the second transmit line, couples the signal via an alternate path to the first transmit line, and creates a bias voltage about which a termination impedance for the second transmit line is centered while operating in test mode.

18 Claims, 5 Drawing Sheets

TERMINATION CIRCUIT FOR NETWORK INTERFACE UNIT

RELATED ART

A network interface unit (NIU) generally refers to a device that serves as an interface for coupling network equipment at a central office (CO) to customer premise equipment (CPE) at a remote site. A typical communication system 100 comprising a conventional NIU 104 is illustrated in FIG. 1.

The NIU 104 connects to CO network equipment 108 of a communication network 102 via a two coaxial cable pair comprising a transmit wire $123_T$ and a receive wire $123_R$. Further, the NIU 104 connects to the CPE 106 via a subscriber line comprising a transmit wire $125_T$ and a receive wire $125_R$. The NIU 104 can be located at any point along the communication link between the communication network 102 and the CPE 106.

The NIU 104 comprises a network interface 120, digital logic 114, and a customer interface 122. The network interface 120 receives an analog signal via analog front end (AFE) circuitry 110 from the CO network equipment 108. The received analog signal is transmitted to a line interface unit (LIU) 112. The LIU 112 performs analog-to-digital conversion on the received analog signal thereby translating the analog signal into a digital signal. The LIU 112 transmits the digital signal representative of the received analog signal to the digital logic 114.

The digital logic 114 typically performs a variety of operations on the received digital signal, e.g., diagnostics operations. The digital logic 114 transmits the digital signal to the customer interface 122. The customer interface 122 transmits the signal to the CPE 106 via the transmit coaxial cable $125_T$.

Furthermore, the customer interface 122 receives an analog signal via AFE circuitry 118 from the CPE 106. The received analog signal is transmitted to a LIU 116. The LIU 116 performs analog-to-digital conversion on the received analog signal thereby translating the analog signal into a digital signal. The LIU 116 transmits the digital signal representative of the received analog signal to the digital logic 114.

Whether a signal is received from the LIU 116 or the LIU 112, the digital logic 114 performs a variety of operations including analyzing the digital signals received and collecting performance data on the link between the CO network equipment 108 and the CPE 106. Additionally, the digital logic 114 is often configured to enable loopback testing and/or bit error rate testing on the communication link between the CPE 106 and the CO network equipment 108.

"Loopback testing" refers to diagnostic testing wherein the NIU 104 receives a signal from either the network equipment 108 or the CPE 106. Note that the NIU can also receive the signal directly at the NIU via a loopback button or via a terminal plugged into the NIU. The NIU 104 then transmits the signal to the appropriate LIU 112 or LIU 116, which transmits the signal back to the corresponding AFE circuitry 110 or 118. During loopback testing, upon receipt of the signal, the receiving AFE, instead of passing the signal to the CO network equipment 108 or the CPE 106, is configured to transmit the signal back to its source, i.e., the network equipment 108 or CPE 106. Once the signal is received at its source, test equipment (not shown) can determine whether a problem exists in the link tested by comparing the signal originally sent and the signal received from the NIU 104.

When loopback testing is performed, the NIU 104 typically requires "quiet termination," on the unused transmit cable as will be shown. Quiet termination is usually provided by placing a matching impedance across a transformer output in order to minimize radiation, reflected signals, crosstalk, and other undesirable signals, in the unused communication channel. If the signal is allowed to reflect, such reflection may cause damage or interference to an interface or nearby circuits.

A conventional circuit for providing quiet termination is depicted in FIG. 2. Notably, each AFE circuitry 110 and 118 is configured to operate similarly. Thus, for brevity, a scenario for performing loopback testing initiated at the CO network equipment 108 (FIG. 1) is described.

In this regard, a technician at the CO network equipment 108 performs a loopback test by transmitting an analog signal to the NIU 104. Prior to receiving the analog signal, the NIU 104 is placed in "loopback mode," such that the received analog signal is analyzed in accordance with such a test by the digital logic 114.

In operation, the signal transmitted from the CO network equipment 108 is received via a coaxial cable connector 202 (FIG. 2) at the NIU 104. A transformer 204 receives the signal from the connector 202. The network AFE circuitry 110 transmits the received signal to the network LIU 112, and receive logic 208 within the network LIU 112 converts the received signal into a corresponding digital signal. The digital logic 114 receives the digital signal from the LIU 112.

The digital logic 114 performs operations in relation to the digital signal received and transmits the digital signal to the transmit logic 234 of the customer LIU 116.

The LIU 116 receives the signal, however, the LIU 116 does not transmit the received signal to the CPE 106 (FIG. 1) via the coaxial connection 241, as would occur during normal operation. Instead, when the NIU 104 is placed in loopback mode, the LIU 116 transmits the signal back to the digital logic 114 via path 281. Such a signal is hereinafter referred to as a "loopback signal."

Furthermore, in loopback mode, a relay 220 is actuated, as indicated by the dotted line representation of the relay 220, such that any undesired signals that may be picked up or coupled to the transmit cable $125_T$ via the connector 241 travel through a resistor 228 to ground. Typically, the impedance of the resistor 228 is substantially equivalent to the impedance ($Z_0$) of the transmit cable $125_T$, so that undesired signals are absorbed by resistor 228 rather than be reflected back toward the CPE. The relay 220 controls any adverse response so that the undesired signals do not damage or interfere with the NIU 104 and/or a receiver (not shown) located at the CPE 106 (FIG. 1).

The receive logic 236 transmits the loopback signal to the digital logic 114, which transmits the received loopback signal through transmit logic 210 of the network LIU 112. The LIU 112 converts the digital signal into an analog signal. The LIU 112 transmits the signal to the network AFE circuitry 110, and the transformer 216 couples the signal to the transmit cable $123_T$ through the coaxial connector 218 connecting the network equipment 108 (FIG. 1) and the NIU 104.

When the signal is received at the network equipment 108 (FIG. 1), the technician that originated the loopback test can use the received data to measure differences between the signal transmitted and the signal received to pinpoint problems or lack thereof in the communication link between the network equipment 108 and the NIU 104.

Thus, during the loopback process described hereinabove, in order to ensure that any undesired signals resulting from noise, crosstalk, or any other source, received by the customer AFE circuitry 118 for the loopback test does not cause undesirable signals in the circuit implementation of the NIU 104 and/or a receiver (not shown) located at the CPE 106 (FIG. 1), the unused communication path is terminated via resistor 228 to ground, thereby providing a "quiet termination." In this respect, when the link between the CO network equipment 108 (FIG. 1) and the NIU 104 (FIG. 1) is being tested, then the circuitry in the customer AFE circuitry 118 is quietly terminated. Specifically, the mechanical relay 220 is actuated in order to establish a connection to ground of the transmit line $125_T$ through resistor 228.

Thus, as in the example provided, when the NIU 104 is placed in loopback mode to test the link between the network equipment 108 and the NIU 104, the relay 220 is actuated from its original position to its position represented by the dotted line. When the relay 220 is actuated, it terminates the transmit cable $125_T$ through resistor 228. The resistor 228 typically exhibits impedance that is equal to the impedance of the line $125_T$.

Typically, the circuitry 116 further comprises resistors 412 and 410. Resistors 412 and 410 usually exhibit a cumulative resistance that matches the impedance of the line $125_T$. The resistors 412 and 410 serve to reduce or eliminate damage to the NIU 104 or CPE 106 (FIG. 1) that may be caused by a short circuit to ground of the line $125_T$ or by signals reflected from line $125_T$. In this regard, because the total impedance of resistors 412 and 410 match the impedance of the line 125T, then the resistors 412 and 410 absorb such interfering or damaging undesired signals.

SUMMARY OF THE DISCLOSURE

Generally, the present disclosure provides methods and systems for enabling loopback testing via a network interface unit while providing electronic quiet termination.

A network interface unit in accordance with an embodiment of the present disclosure has an interface coupled to a first transmit line and a first receive line, and the interface is configured to receive a signal from the first receive line. The network interface unit further has circuitry operable in a test mode and a data mode that couples the received signal to the second transmit line via a first path while operating in the data mode. The circuitry further disables coupling of the signal to the second transmit line, couples the signal via an alternate path to the first transmit line, and creates a bias voltage about which a termination impedance for the second transmit line is centered while operating in test mode.

A method in accordance with an embodiment of the present disclosure comprises the steps of receiving a signal from a first receive line and coupling the received signal to a first transmit line via a first path while operating in a data mode. The method further comprises the steps of disabling coupling of the received signal to the first transmit line while operating in a test mode, coupling the signal via an alternate path to a second transmit line, and creating a bias voltage about which a termination impedance for the second transmit line is centered while operating in test mode.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Embodiments of the present disclosure generally pertain to a network interface unit (NIU) that quietly terminates a line during loopback testing. In this regard, the NIU comprises at least two modes, which can include "loopback testing mode" and "data mode." Loopback testing mode refers to a mode in which the NIU can be placed that allows loopback testing to occur through and/or within the NIU. Data mode refers to a mode in which the NIU can be placed for normal operation, i.e., the transmission of data from a central office to customer premise equipment or from the customer premise to the central office.

Figure 1:
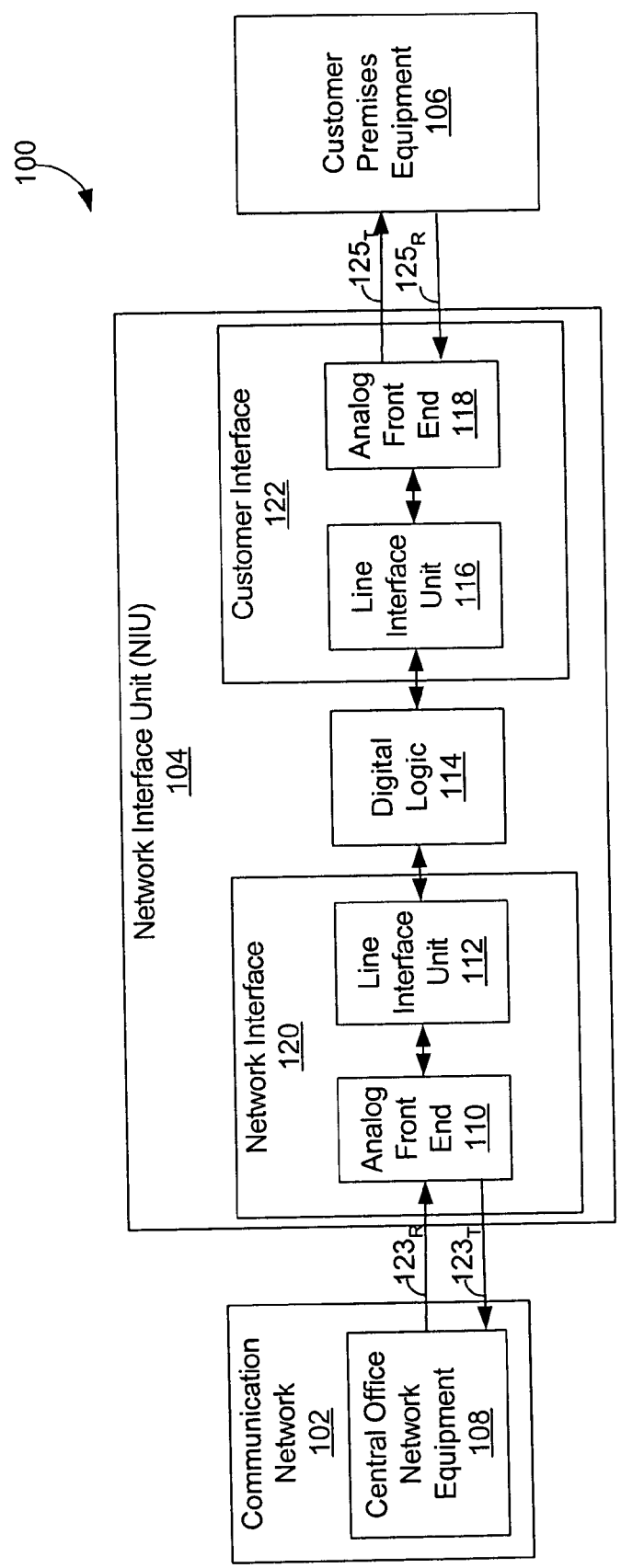
FIG. 1 is a block diagram illustrating a conventional communication system.
Figure 2:
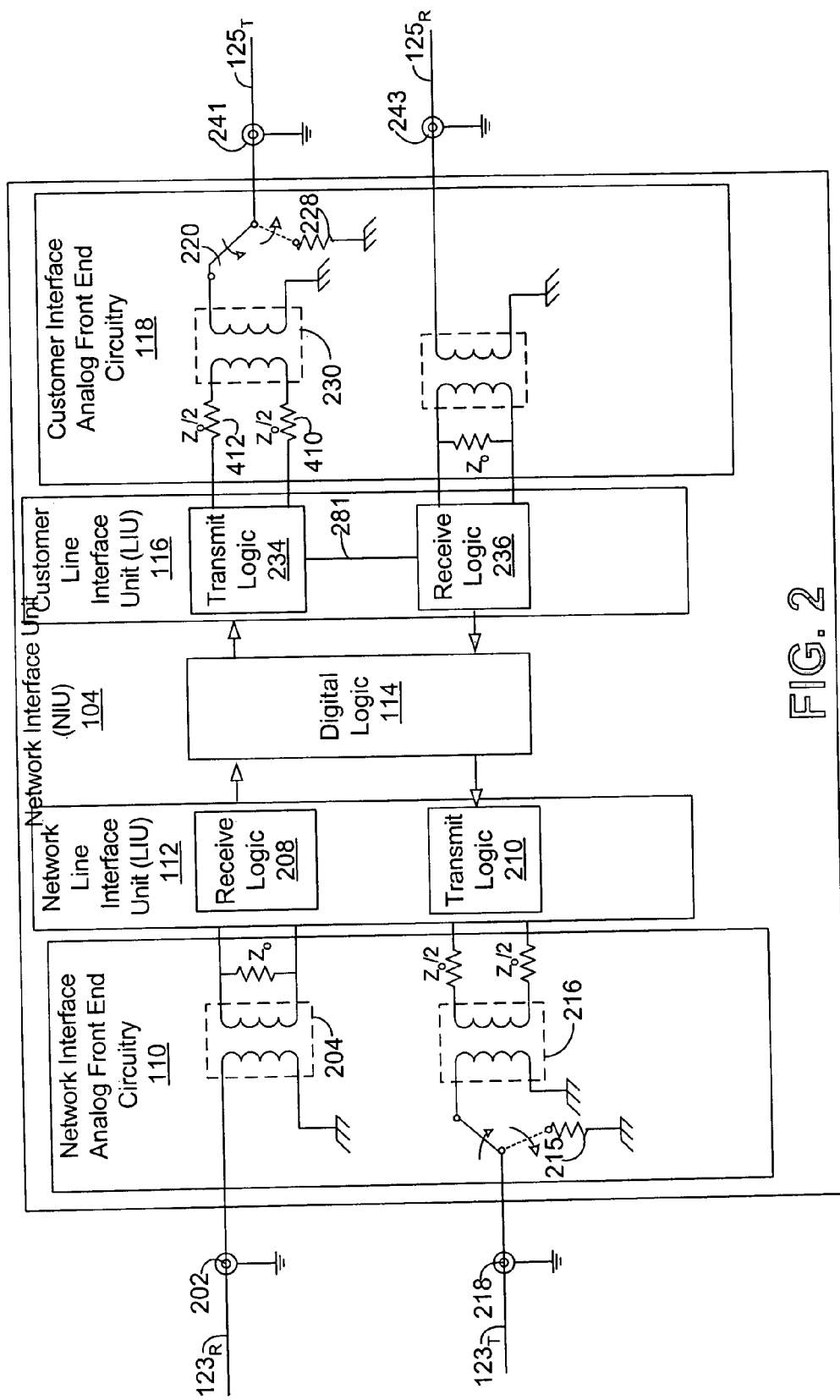
FIG. 2 is a circuit diagram of a network interface unit (NIU) of the conventional communication system of FIG. 1.
Figure 3:
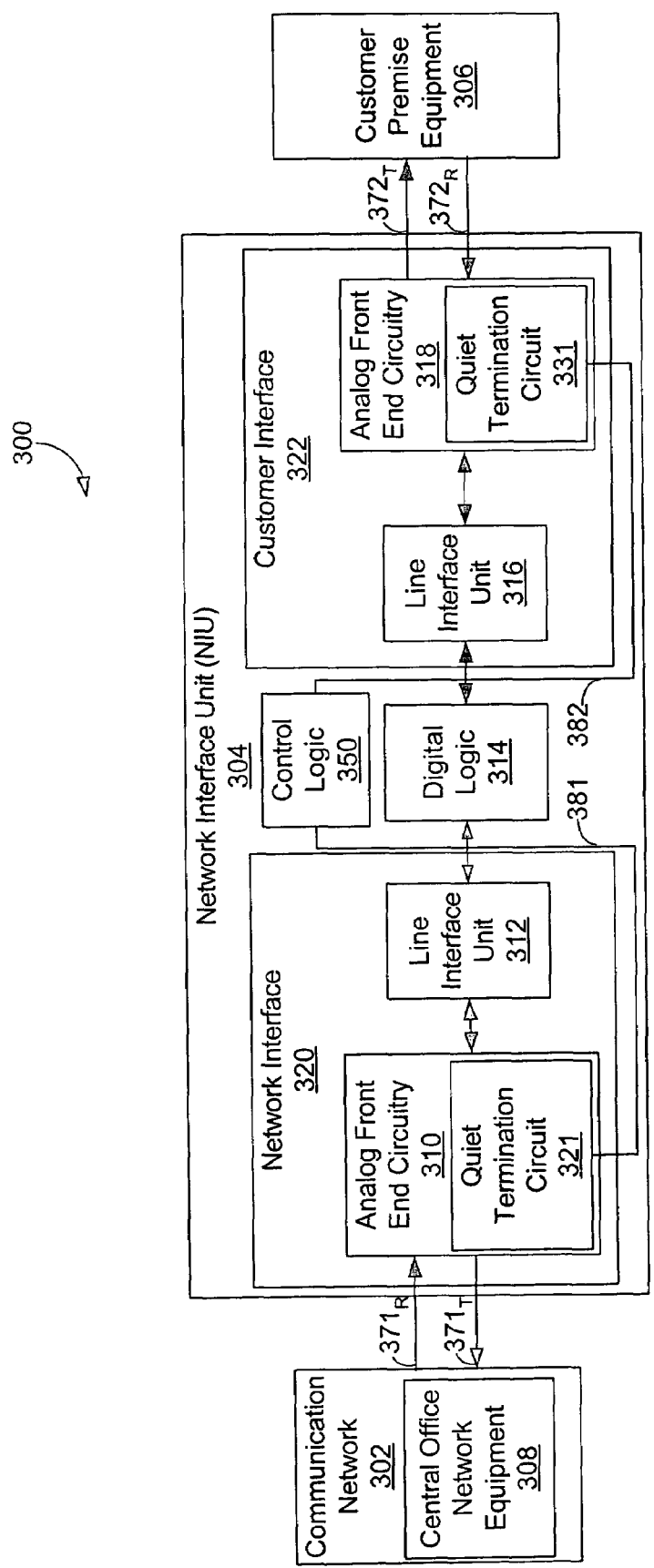
FIG. 3 is a block diagram illustrating a communication system in accordance with an exemplary embodiment of the present disclosure.

A communication system 300 in accordance with an exemplary embodiment of the present disclosure is illustrated in FIG. 3. As shown by FIG. 3, a network interface unit (NIU) 304 connects CO network equipment 308 of a communication network 302 to customer premise equipment (CPE) 306. The NIU 304 comprises a network interface 320, digital logic 314, control logic 350, and a customer interface 322.

The network interface 320 comprises analog front end (AFE) circuitry 310 with a quiet termination circuit 321 and a line interface unit (LIU) 312. The customer interface 322 comprises analog front end (AFE) circuitry 318 with a quiet termination circuit 331 and a line interface unit (LIU) 316. Notably, the AFE circuitry 310 and the AFE circuitry 318 are configured similarly, and the LIU 312 and the LIU 316 are configured similarly.

During normal operation, the AFE circuitry 310 receives an analog signal from the CO network equipment 308 via receive cable $371_R$. The AFE circuitry 310 couples the signal to the LIU 312, and the LIU 312 converts the analog signal to a digital signal. The LIU 312 transmits the digital signal to the digital logic 314.

Prior to transmitting the digital signal to the LIU 316 so that the signal can be forwarded to its desired destination, i.e., the CPE 306, the digital logic 314 may be configured to perform a variety of operations relating to the digital signal, including analyzing the digital signal and collecting performance data on the link between the CPE 306 and the CO network equipment 308. Additionally, the digital logic 314 enables loopback testing on the communication links between the CPE 306 and the CO 308 by causing a signal received by the NIU 304 to be transmitted back to its source for testing each section of the communication link.

During data mode, as described herein, the digital logic 314 performs operations on the digital signal, the digital signal is transmitted to the LIU 316, which converts the digital signal into an analog signal and transmits it to the AFE circuitry 318. The AFE circuitry 318 then transmits the analog signal to the CPE 306 via the transmit cable $372_T$.

Likewise, during operation, the CPE 306 transmits an analog signal, via the receive cable $372_R$, to the NIU 304 for transmission, via the transmit cable $371_T$, to the communication network 302. The analog signal is received by the AFE circuitry 318 of the customer interface 322. The AFE circuitry 318 transmits the signal to the LIU 316, which converts the analog signal to a digital signal and transmits the digital signal to the digital logic 314. The digital logic 314 may perform operations, as described hereinabove, in relation to the received digital signal.

The digital logic 314 transmits the digital signal to the network interface 320. The LIU 312 of the network interface 320 receives the digital signal and converts it to an analog signal. The LIU 312 transmits the analog signal to the AFE circuitry 310, which transmits the signal to the CO network equipment 308, via transmit cable $371_T$.

During normal operation, the control logic 350 transmits a control signal indicative of data mode to the quiet termination circuit 321 or 331 via the connections 381 and 382. For example, the control signal transmitted may comprise a plurality of logical values that, when received, control the behavior of the quiet termination circuits 321 and 331 such that the NIU 304 facilitates communication from the CO network equipment 308 to the CPE 306 and vice versa.

In order to test a communication link, a test mode operation, in the communication path from the communication network 302 to the CPE 306 a technician may initiate a variety of tests. One such test, for example, is a loopback test or a bit error rate test (BER). Such tests may be initiated from the CO network equipment 308, from the NIU 304, and/or from the CPE 306.

When such a loopback test is desired, a technician may manually or remotely place the NIU 304 in loopback mode, for example, either manually or remotely. For example, the NIU 304 may comprise an interface (not shown) that enables a user to provide inputs for placing the NIU 304 in loopback. When the NIU 304 is placed in loopback mode, the control logic 350 is configured to place either the quiet termination circuit 321 or 331 in quiet termination mode by transmitting a control signal to the quiet termination circuit 321 or 331 indicating test mode. Both termination circuits 321 and 331 are preferably not in the quiet termination mode simultaneously. Such a control signal may comprise, for example, logical signals for controlling the quiet termination circuit 321 or 331. Such is described in more detail with reference to FIG. 4. Furthermore, when test mode is completed, the control logic 350 is configured to transmit a signal to the circuits 321 or 331 indicative of the data mode. The circuits 321 and 331, in response to the data mode signal, resume operating in data mode, i.e., transmitting data to the transmit lines $371_T$ and $372_T$.

For brevity, a loopback test initiated at the CO network equipment 308 that tests the communication path comprising the CO network equipment 308, the network interface 320, the digital logic 314, and the customer interface 322 is described as an exemplary scenario. A technician may initiate a loopback test via the CO network equipment 308 via test equipment (not shown) by transmitting an analog signal to the NIU 304.

In order to effectuate the loopback test, the technician remotely places the NIU 304 in loopback test mode, or alternatively, the technician may manually place the NIU 304 in loopback test mode, as described hereinabove. Placing the NIU 304 in loopback mode is described in more detail with reference to FIG. 4.

When the NIU 304 is placed in loopback mode, the control logic 350 preferably transmits a control signal indicative of loopback mode to the quiet termination circuit 321 or 331 via the connections 381 or 382. Which circuit 321 or 331 is placed in loopback mode depends upon where the test is and/or the type of test that is being initiated.

For example, if the loopback test is initiated at the CO network equipment 308, then the control logic 350 configures the NIU 304 to loop a received signal back to the CO network equipment 308. Additionally, the control logic 350 places the quiet termination circuit 331 in quiet termination loopback mode. Such a configuration is sufficient to test the communication link between, for example, the CO network equipment 308 and the AFE circuitry 318 of the NIU 304.

However, if the loopback test is initiated at the CPE 306, then the control logic 350 configures the NIU 304 to loop a received signal back to the CPE 306. Additionally, the control logic 350 places the quiet termination circuit 321 in quiet termination loopback mode. Such a configuration is sufficient to test the communication link between, for example, the CPE 306 and the AFE circuitry 310 of the NIU 304.

In this regard, when the NIU 304 is in loopback mode, the AFE circuitry 310 or AFE circuitry 318 no longer transmits signals to the CO network equipment 308 or the CPE 306, respectively. However, during testing, signals may still be present on the line $371_T$ or $372_T$, such as, for example, there may be alternating current (AC) signals resulting from noise or crosstalk on the line $371_T$ or $372_T$. Further, a signal may be transmitted to the NIU 304 unintentionally via lines $371_T$ or $372_T$. Such signals are hereinafter referred to as "undesired signals." Such undesired signals could possibly cause component damage or interference to the NIU 304, the central office equipment 308 or the customer premise equipment 306. Therefore, the quiet termination circuits 321 or 331 ensures that such undesired signals do not cause component damage or otherwise interfere with operation of the NIU 304.

Figure 4:
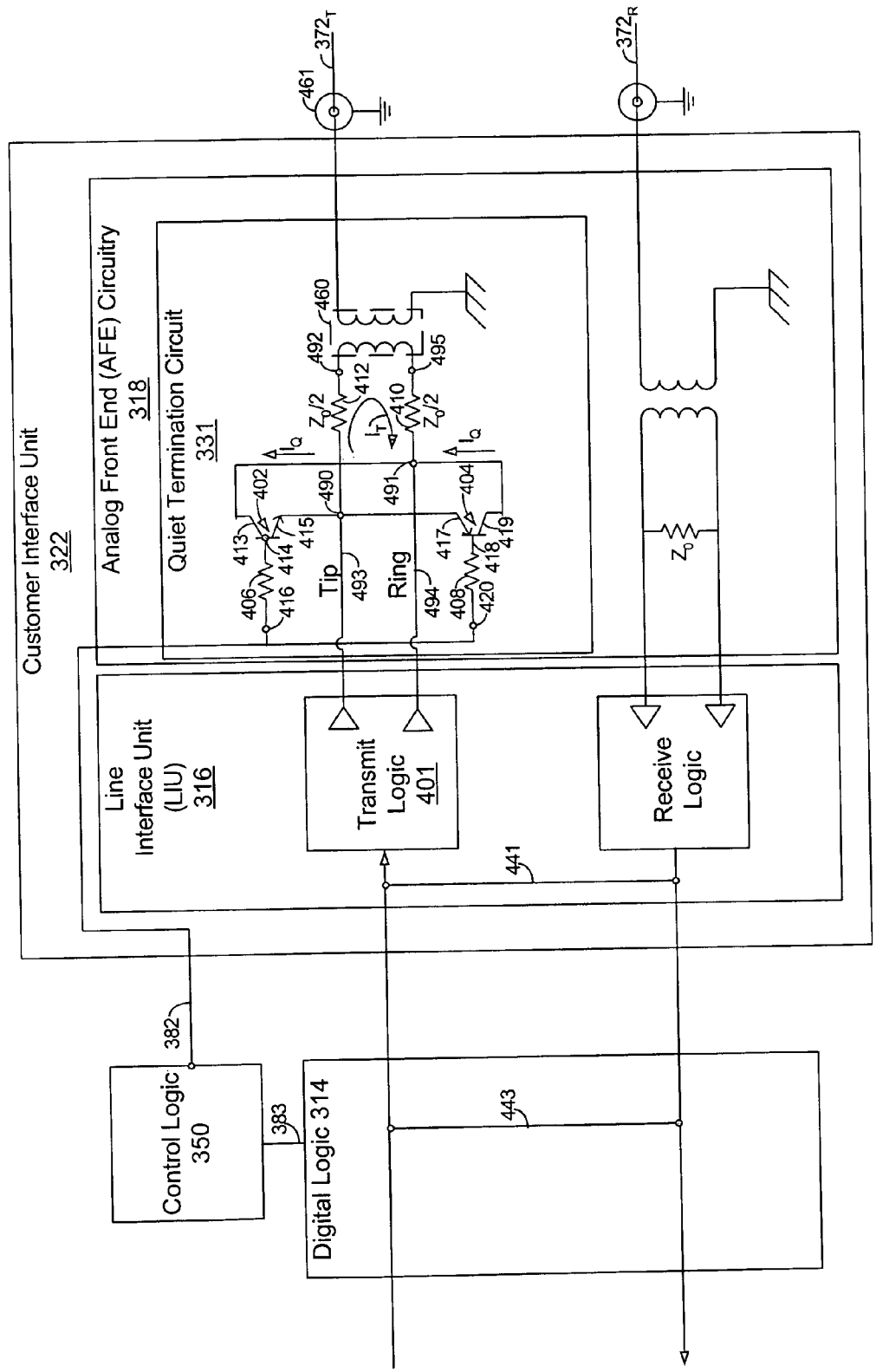
FIG. 4 is a circuit diagram of an NIU in accordance with an exemplary embodiment of the present disclosure.

Therefore, if the path being tested, begins at the CO network equipment 308 and is looped back at the customer interface 322, then the LIU 316 is preferably configured to transmit the received test signal back to the digital logic 314, as described further herein with reference to FIG. 4. Additionally, the quiet termination circuit 331 of the AFE circuitry 318 is configured to quietly terminate the transmit line $372_T$ to avoid any undesired signals received on the transmit line $372_T$.

Furthermore, if the path being tested begins at the CPE 306 and is looped back at the AFE circuitry 310 of the network interface 320, then the LIU 312 is preferably configured to transmit the received test signal back to the digital logic 314. Additionally, the quiet termination circuit 321 of the AFE circuitry 310 is configured to quietly terminate the line to avoid any undesired signal received on the subscriber line $371_T$.

As an example, the test signal is initiated by the technician at the CO network equipment 308 and is received by the AFE circuitry 310 of the network interface 320. The AFE circuitry 310 transmits the analog signal to the LIU 312, which converts the analog signal to a digital signal. The digital logic 314 then performs various operations corresponding to the signal, as described hereinabove.

The digital logic 314 transmits the digital signal to the LIU 316. However, instead of passing the signal through to the AFE circuitry 318, as is done during normal operation as described hereinabove, the LIU 316 redirects the signal back to the digital logic 314. Such a signal is hereinafter referred to as a "loopback signal."

The digital logic 314 then transmits the signal to the LIU 312, which converts the digital loopback signal to an analog signal. The LIU 312 transmits the analog signal to the AFE circuitry 310, which transmits the signal back to its source, e.g., the CO network equipment 308.

Furthermore, the control logic 350 has placed the quiet termination circuit 331 in loopback mode. Therefore, while the test signal is being transmitted to the NIU 304 and back to the CO network equipment 308, the quiet termination circuit 331 ensures that any alternating current (AC) signal, as described hereinabove, that may appear on the line $372_T$ does not cause damage to the NIU 304 or otherwise interfere with operation.

If the NIU 304 was not quietly terminated, then undesired signals that appeared on the line $372_T$ may be coupled to electronic components (not shown) of the NIU 304, thereby exposing such electronic components to possible damage or interference. In such a scenario, the signals received over the line $372_T$ could potentially damage or interfere with the components it encounters as it travels and/or is reflected through the NIU 304.

The test equipment (not shown) that is used by the technician to initiate the test signal receives the transmitted analog signal at the CO network equipment 308. The loopback signal received can be analyzed either electronically and/or manually to determine whether a problem exists in the communication link between the CO network equipment 308 and the CPE equipment 306 and where the problem is located. In this regard, the technician can compare the loopback signal to the signal that was transmitted in initiating the loopback test.

FIG. 4 illustrates an exemplary circuit implementation of the quiet termination circuit 331 of the AFE circuitry 318 depicted in FIG. 3. Note that the circuitry 321 and 331 are preferably configured similarly and configured to behave in like manner.

The quiet termination circuit 331 comprises a transistor 402 and a transistor 404. In one embodiment, each transistor 402 and 404 is a bipolar junction transistor (BJT), which is a three-terminal device in which the current through the collector 413 and 419, respectively, is controlled by a current in the base 414 and 418.

The quiet termination circuit 331 further comprises the resistors 412 and 410, which absorb undesired signals, as described hereinabove. As described further herein, the resistors 412 and 410 also absorb undesired signals that may be present when the quiet termination circuit 331 is activated.

During normal operation, the control logic 350 (FIG. 3) transmits a logical zero, e.g., ground, to connection 416 via connection 382, i.e., connects connection 416 to ground. Further, the control logic 350 transmits a logic one (1) to connection 420 via connection 382, i.e., connects connection 420 to VCC, the operating supply voltage.

Thus, during normal operation, no current flows from collector 413 to emitter 415, because no current is present at the base 414 of the transistor 402. Furthermore, no current flows from emitter 417 to collector 419, because no current is present at the base 418 of the transistor 404. Thus, a path through transistors 402 and 404 behaves as an open circuit, i.e., it is unnoticeable by the remainder of the circuitry in the AFE circuitry 318.

Thus, during normal operation, a signal received from the transmit logic 401 is coupled to the line $372_T$ through the coaxial connector 461 via the transformer 460. In this regard, the transistors 402 and 404 do not conduct current as the transmit logic 401 transmits a signal via tip connection 493 and ring connection 494 to a line $372_T$, because the base emitter junctions of the respective transistors 402 and 404 are reverse biased so as not to produce a current from the connection 416 to the connection 420.

However, when the control logic 350 places the NIU 304 (FIG. 3) in test mode, resulting from manual or remote actuation, the control logic 350 places logical one VCC at connection 416 and logical zero ground at connection 420. Thus, current flows from point 416 to point 420. As such, if resistors 406 and 408 are identical and if base-emitter junction voltages of transistors 402 and 404 are identical in magnitude, half of the applied voltage, VCC, at connection 416 drops across resistor 406 and the base-emitter junction of transistor 402 such that the voltage at connection 490 is VCC/2. Further, half of the voltage drops across the emitter-base junction of transistor 404 and resistor 408. Therefore, the arrangement of transistors 402 and 404 biases any AC signal about VCC/2 at point 490 and point 491. In this regard, if the voltage, VCC, applied to connection 416 is equal to the operating voltage of the transmit logic 401, then any undesired signal would be biased about half the operating voltage of the transmit logic 401.

If the operating voltage of the transmit logic 401 is 3.3 Volts and any undesired signal is biased about 1.65 Volts, i.e., VCC/2, then the voltage of any undesired signal will not rise above 3.3 Volts or drop below 0 Volts, thereby preventing damage to and/or interference with the NIU 304 due to the bias applied at points 490 and 491.

In this regard, each emitter 415 and 417 acts as a diode and prevents any direct current from flowing in a direction opposite $I_Q$. Furthermore, in order for the direct current $I_Q$ to flow from collector 413 through emitter 415 or from emitter 417 through collector 419, the voltage at emitter 417 must be greater than the voltage at emitter 415, as described hereinabove. However, emitters 415 and 417 have equal voltages, as described, and the collectors 413 and 419 have equal voltages, as described.

Therefore, when VCC, e.g., a logical one (1), is applied to connection 416 and connection 420 goes to ground, the direct current $I_T$ through the transformer 460 is zero, because the collectors 413 and 419 cannot conduct direct current. If the direct current $I_T$ is equal to zero, then no portion of the direct current through point 490 is transmitted though the transformer 460.

Furthermore, as described herein, resistor 412 and resistor 410 exhibit a cumulative resistance that is equal to the impedance present in the line $372_T$. While the interface unit 322 is in test mode, undesired signals may be present on the transmit line $372_T$. In this regard, an undesired signal may be present on 372T, and the transformer 460 couples the signal to the tip connection 492 and ring connection 495. When the signal at the tip connection 492 is greater than the signal at the ring connection 495 resulting from an undesired signal on line 372T, the signal is terminated as current travels from tip connection 492 through resistor 412, from point 490 to emitter 417, through collector 419, through resistor 410, and back to the ring connection 495.

Likewise, when the signal at the ring connection 495 is greater than the signal at the tip connection 492 resulting from an undesired signal on line 372T, the signal is terminated as current travels from ring connection 495 through resistor 410, from point 491 to collector 413, through emitter 415, through resistor 412, and back to the tip connection 492.

In one embodiment, the transmit logic 401 drives an alternating current (AC) signal that is biased about approximately 1.65 Volts and ensures that the voltage present does not fall below ground and does not rise above VCC. Thus, since the voltage does not fall below ground, as long as the there is an applied ground at connection 416 and an applied logical one (1) at connection 420, which can be approximately 3.3 Volts in one embodiment, then both transistors 402 and 404 remain inactive. In such an embodiment, because the signal driven by the transmit logic 401 is approximately centered about 1.65 Volts, the undesired signals do not go above approximately 3.3 Volts nor below ground. Therefore, the voltage present at the emitter 415 of transistor 402 does not go below ground, the voltage present at the base 414, and transistor 402 remains inactive. Further, the voltage present at the emitter 417 of the transistor 404 does not increase above the voltage present at the base 418 during normal operation, i.e., approximately 3.3 Volts. Thus, the transistors 402 and 404 remain non-conducting during normal operation. In this regard, during normal operation, the transistors 402 and 404 and the conductive path through such transistors is invisible to the signals being driven by the transmit drivers 401.

As described herein, in such an embodiment, when a loop-back test is performed the control logic 350 drives connection 416 at approximately 3.3 Volts and connection 420 to ground. During such a test, the transmit drivers 401 are tri-stated making them high impedance, which could cause signals received at the connector 461 to be reflected, as described hereinabove.

However, when approximately 3.3 Volts is applied to the connection 416, current flows from connection 416 to connection 420, as described herein. If resistances 406 and 408 exhibit equal ohm characteristics and the base-emitter junction voltages of transistors 402 and 404 are identical in magnitude, then the voltage at point 490 would be approximately 1.65 Volts, which means that point 491 is approximately 1.65 Volts because the transmit drivers are at high impedance so no current is flowing through the transformer 460. Therefore, since the voltage at the emitter 417 of transistor 404 is greater than the voltage at the base 418, current flows through the transistor 404 to ground 420.

When the control logic 350 places the customer interface 322 in test mode, as described herein. Any signal received by the network interface unit 304 (FIG. 3) is transmitted to the equipment that transmitted the signal. In this regard, with reference to FIG. 4, the signal received may be turned back toward the network equipment 308 (FIG. 3) by the line interface unit 316. Thus, a connection 441 may be provided on which to transmit the signal back to the digital logic 314. In another embodiment, the digital logic 314 may receive a signal via connection 383 from the control logic 350. In such an embodiment, the digital logic 314 might turn the signal around for transmission back to the network equipment 308 via the connection 443. Such connection 441 and 443 may comprise, for example, a relay device that is actuated when the control signal is received that is indicative of a test mode.

Notably, when the NIU 304 (FIG. 3) is in test mode, signals received are no longer propagated, via the transformer, to the transmit line 372$_T$. Instead, the signals are propagated back to the transmitting device, e.g., the network equipment 308. During such testing, the quiet termination circuit 331 ensures that any noise or other extraneous undesired signal received over the transmit line 372$_T$ does not damage nor interfere with any electronic components (not shown) within the NIU 304.

Further note that while quiet termination circuit 331 is shown in FIG. 4 and described in detail, in one embodiment, circuit 321 is configured similarly or identical to the circuit 331. Thus, circuit 321 quietly terminates the transmit line 371$_T$ in the manner that 331 quietly terminates 372$_T$.

Figure 5:
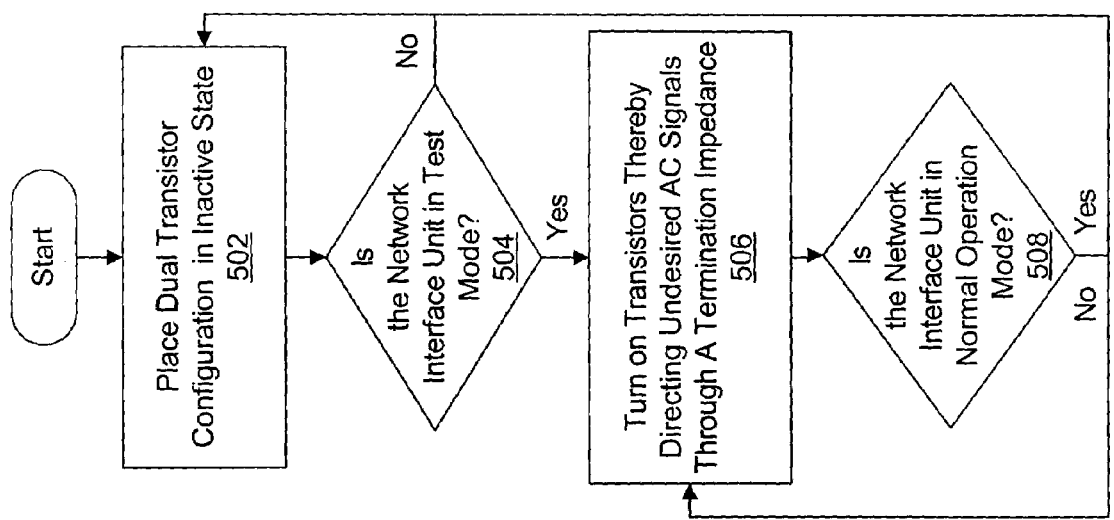
FIG. 5 is an exemplary architecture and functionality of the circuit of FIG. 4.

FIG. 5 is an exemplary architecture and functionality of the quiet termination circuit 331 in FIG. 4.

Each transistor in the transistor pair 402 and 404 is placed in inactive state in step 502. In one embodiment, the control logic 350 places a logic one (1), e.g., approximately 3.3 Volts, at connection point 420 and a logic zero (0), e.g., ground, at connection point 416. Because the transmit drivers 401 (FIG. 4) provide a voltage below VCC and above ground, each transistor remains inactive.

If the NIU 304 is place in test mode manually and/or remotely, as indicated in step 504, then the control logic 350 places a logic zero (0), e.g., ground, at connection point 420 and a logic one (1), e.g., 3.3 Volts, at connection point 416. Therefore, the control logic 350 turns on the transistors 402 and 404 (FIG. 4), and the transistor 402 and 404 bias undesired signals received via the transformer 460 such that noise, crosstalk or other forms of undesired signals can not damage nor interfere with the NIU 304.

If the NIU 304 is placed back into normal operating mode in step 506, the control logic 350 places the dual transistor configuration of transistors 402 and 404 in inactive state. However, the control logic 350 leaves the transistors 402 and 404 active while in the test mode.

The invention claimed is:

1. A network interface unit, comprising:
    an interface coupled to a first transmit line and a first receive line, the interface configured to receive a signal from the first receive line;
    a transformer coupled to the interface and a second transmit line;
    circuitry operable in a test mode and a data mode, the circuitry configured to couple the received signal to the second transmit line via a first path through the transformer while operating in the data mode, the circuitry further configured to disable coupling of the signal to the second transmit line and couple the signal via an alternate path to the first transmit line in the test mode; and
    at least one resistive element coupled to the transformer and the interface and within the first path such that the signal passes through the at least one resistive element between the transformer and the interface in the data mode,
    wherein the circuitry is further configured to quietly terminate the second transmit line in the test mode by coupling the at least one resistive element to a return path such that noise on the second transmit line is absorbed by the at least one resistive element in the test mode.

2. The network interface unit of claim 1, wherein the circuitry is further configured to transition from the data mode to the test mode in response to input.

3. The network interface unit of claim 1, wherein the first receive line comprises a tip connection and a ring connection.

4. The network interface unit of claim 3, wherein the tip connection and the ring connection are connected to a first transistor and a second transistor.

5. The network interface unit of claim 4, wherein the first transistor and the second transistor are configured to remain inactive while the circuitry is operating in data mode.

6. The network interface unit of claim 5, wherein the circuitry transitions from data mode to test mode in response to an input.

7. The network interface unit of claim 6, wherein, in response to the input, the first transistor activates thereby generating a direct current (DC) bias voltage about which any undesired signals are terminated.

8. The network interface unit of claim 7, wherein when the second transistor activates thereby generating a direct current (DC) bias voltage about which any undesired signals are terminated.

9. The network interface unit of claim 8, wherein the input activating the first transistor is equal to the operating voltage of the network interface unit and a signal received via the second transmit line while the circuitry is in test mode is biased at half the operating voltage.

10. A method for terminating a communication line, the method comprising the steps of:
    receiving a signal from a first receive line;
    coupling the received signal through at least one resistive element and a transformer to a first transmit line via a first path while operating in a data mode;

disabling the coupling of the received signal through the at least one resistive element and the transformer to the first transmit line step while operating in a test mode;

coupling the signal via an alternate path to a second transmit line in the test mode; and quietly terminating the first transmit line in the test mode, the quietly terminating step comprising the step of coupling the at least one resistive element to a return path such that noise on the first transmit line is absorbed by the at least one resistive element in the test mode.

11. The method of claim 10, wherein the quietly terminating step comprises the step of activating a first and second transistor.

12. The method of claim 11, wherein the first and second transistors are activated in response to an input.

13. The method of claim 11, wherein the first transistor and the second transistor are configured to remain inactive until an input indicative of a test mode is received by the first transistor.

14. The method of claim 13, wherein when the input activates the first transistor a current flows to the second transistor thereby creating the bias voltage about which a termination impedance for the second transmit line is centered.

15. The method of claim 11, further comprising the step of receiving an input indicative of a data mode, the input indicative of the data mode deactivating the first and second transistor.

16. A quiet termination circuit, the circuit comprising:

a transformer coupled to a transmit line;

a first transistor coupled to a second transistor, the first transistor and second transistor further coupled to the transmit line, the first transistor and the second transistor configured to remain inactive while data is transmitted via the transmit line in a data mode;

at least one resistive element coupled to the transformer and the transistors, the data transmitted through the at least one resistive element during the data mode; and control logic configured to activate at least one of the first or second transistors in test mode in a test mode such that noise on the transmit line is absorbed by the at least one resistive element thereby quietly terminating the transmit line in the test mode.

17. The network interface of claim 1, wherein a resistance of the at least one resistive element is equal to an impedance of the second transmit line.

18. The network interface unit of claim 1, wherein the circuitry is configured to create a bias voltage about which a termination impedance for the second transmit line is centered while operating in the test mode.

* * * * *